United States Patent [19]

Igarashi

[11] Patent Number: 5,103,480
[45] Date of Patent: Apr. 7, 1992

[54] FMX IDENTIFICATION SIGNAL DETECTION APPARATUS

[75] Inventor: Yoshito Igarashi, Maebashi, Japan

[73] Assignee: Victor Company of Japan, Yokohama, Japan

[21] Appl. No.: 567,866

[22] Filed: Aug. 15, 1990

[30] Foreign Application Priority Data

Aug. 16, 1989 [JP] Japan .................................. 1-95852

[51] Int. Cl.$^5$ .............................................. H04H 5/00
[52] U.S. Cl. ........................................ 381/13; 381/12
[58] Field of Search ............................. 381/12, 13, 15; 455/154, 214

[56] References Cited

U.S. PATENT DOCUMENTS

| 4,420,658 | 12/1983 | Loughlin ................. 381/15 |
| 4,485,483 | 11/1984 | Torick et al. . |
| 4,809,328 | 2/1989 | Usui et al. ................ 381/13 |
| 4,914,680 | 4/1990 | Tanno et al. ............. 455/154 |
| 4,982,431 | 1/1991 | Tanno ..................... 381/13 |

FOREIGN PATENT DOCUMENTS 0284101 9/1988 European Pat. Off. ............. 381/13

OTHER PUBLICATIONS

"88' Sanyo Semiconductor Data Book ... Bipolar Integrated Circuit in Car Audio Use", pp. 229–233.

Primary Examiner—Forester W. Isen
Assistant Examiner—Sylvia Chen
Attorney, Agent, or Firm—Fleit, Jacobson, Cohn, Price, Holman & Stern

[57] ABSTRACT

There is provided a FMX ID signal detection apparatus for discriminating between a FM broadcasting by means of a FM signal including a sum and difference signals M and S obtained from stereophonically related audio frequency source signals by matrix processing and a FMX broadcasting by means of a FMX composite signal including a compressed difference signal SD obtained by compresssing the dynamic range of the signal S, a FMX identification signal and the signals M and S. The apparatus comprises a reproducer for reproducing the signals M and S when the FM signal is applied thereto and for reproducing the signals M and S and the signal SD when the FMX composite signal is applied thereto, a filter for picking a frequency component corresponding to the FMX identification signal from the signal SD, a detector for detecting the FMX identification signal from the freqency component to produce a FMX detection signal, a PLL circuit for producing a control signal in the case of locking onto the frequency component and a mode/dematrix circuit for performing dematrix processing at FM mode when the signals M and S are applied thereto to produce the source signals and also performing dematrix processing at FMX mode when the signals M and S, the signal SD, the FMX detection signal and the control signal are applied thereto to produce the source signals.

2 Claims, 3 Drawing Sheets

FMX IDENTIFICATION SIGNAL DETECTION APPARATUS

BACKGROUND OF THE INVENTION

This invention relates to a receiver for FM/FMX broadcasting. More specifically, this invention relates to a FMX ID (identification) signal detection apparatus for detecting an ID signal identifying a received broadcasting as not a FM but FMX broadcasting.

As is already known, in a FM stereophonic broadcasting, stereophonically related audio frequency source signals L (left) and R (right) are converted into a sum signal M (L+R) and a difference signal S (L−R). Then, the signal M is converted into a frequency in the region of 50 Hz to 15 KHz, while the signal S 23 to 53 KHz by sub-carrier system so as to be broadcasted, respectively.

In the case of frequency modulation, as is already known, the noise spectral characteristics includes so-called triangular noise in which the higher the modulated frequency, the more the noise increases. Therefore, in a weak electric field state such as long distance reception, larger noise is generated in the signal S than M, the frequency of the former being higher than the latter. This results in more noise in the stereo broadcasting than monoral bloadcasting.

Accordingly, in the FMX broadcastinn, noise is reduced by employing a FMX difference signal SD which is obtained b compressing the dynamic range of the signal S.

The signal SD is broadcasted by modulating a subcarrier 90 degrees out of phase with that for the signal S. Furthermore, an ID signal for identifying the FMX broadcasting is added to the signal SD by modulating the signal SD with a signal of 9.986 Hz with modulation level of 1%. These signals M, S, SD and a pilot signal constitute a FMX composite signal.

Such as U.S. Pat. No. 4,485,483 issued Nov. 27, 1984 to E. Torick, et al. discloses the basic principle of a FMX broadcasting system detail.

FIG. 1 shows conventional apparatus for detecting the ID signal. The FMX composite signal is applied to a terminal 20 by a receiving means not shown. The terminal 20 is connected to a demodulator 22 at its input. The demodulator 22 at its output where the signal SD is produced is directly connected to a mode/dematrix circuit 28 at its imput and also connected thereto at its other input through a band pass filter 24 and an ID detection circuit 26.

On the other hand, the demodulator 22 at its other output where the signals M and S are produced is connected to the mode/dematrix circuit 28 at its input to which the signal SD is directly connected. The mode/-dematrix circuit 28 produces a demodulated sound signal at its output and its detection output is connected to a FMX indicator 30 which is applied with a drive voltage Vcc.

When the FMX composite signal is received, it is demodulated by the demodulator 22 and the signals M, S and SD are produced therefrom, respectively. The signal SD is applied to the band pass filter 24 which picks a frequency component corresponding to the ID signal from the signal SD. The frequency component is applied to the ID detection circuit 26 where the level of the frequency component is examined to detect the ID signal.

When the ID signal is detected, it is acknowledged by the mode/dematrix circuit 28. The mode/dematrix circuit 28 switches the demodulated sound signal to a FMX signal based on the acknowledgement and the FMX indicator 30 is turned on. Accordingly, it is indicated that the FMX broadcasting is now received.

However, it is difficult to narrow a frequency band width of the band pass filter 24. Thus, there is a problem that the detection circuit often malfunctions when a low frequency noise is superimposed on the signal SD. Namely, even though the FM broadcasting is now received, the mode/dematrix circuit 28 erroneously switches the demodulated sound signal to the FMX signal.

SUMMARY OF THE INVENTION

It is an object of the present invention to provide a FMX ID signal detection apparatus which detects an ID signal without malfunction due to noises.

In carrying out our invention in one preferred mode, we utilize a FMX ID signal detection apparatus for discriminating between a FM broadcasting by means of a FM signal including a sum and difference signal obtained from stereophonically related audio frequency source signals b matrix processing and a FMX broadcasting by means of a FMX composite signal including a compressed difference signal obtained by compressing the dynamic range of the difference signal, a FMX identification signal and the sum and difference signals.

The apparatus comprises a reproducing means for reproducing the sum and difference signals when the FM signal is applied thereto and for reproducing the sum and difference signals and the compressed difference signal when the FMX composite signal is applied thereto, a filter means for picking a frequency component corresponding to the FMX identification signal from the compressed difference signal, an identification signal detecting means for detecting the FMX identification signal from the frequency component to produce a FMX detection signal, a phase-locked loop circuit means for producing a control signal in the case of locking onto the frequency component picked by the filter means and a mode/dematrix circuit means of performing dematrix processing at FM mode when the sum and difference signals are applied thereto to produce the source signals and also performing dematrix processing at FMX mode when the the sum and difference signals, the compressed difference signal, the FMX detection signal and the control signal are applied thereto to produce the source signals.

Other objects and advantages of the present invention will become apparant from the detailed description to follow taken in conjunction with the appended claims.

DESCRIPTION OF THE PREFERRED EMBODIMENT

The present invention will now be described in detail with reference to the accompanying drawings.

Figure 1:
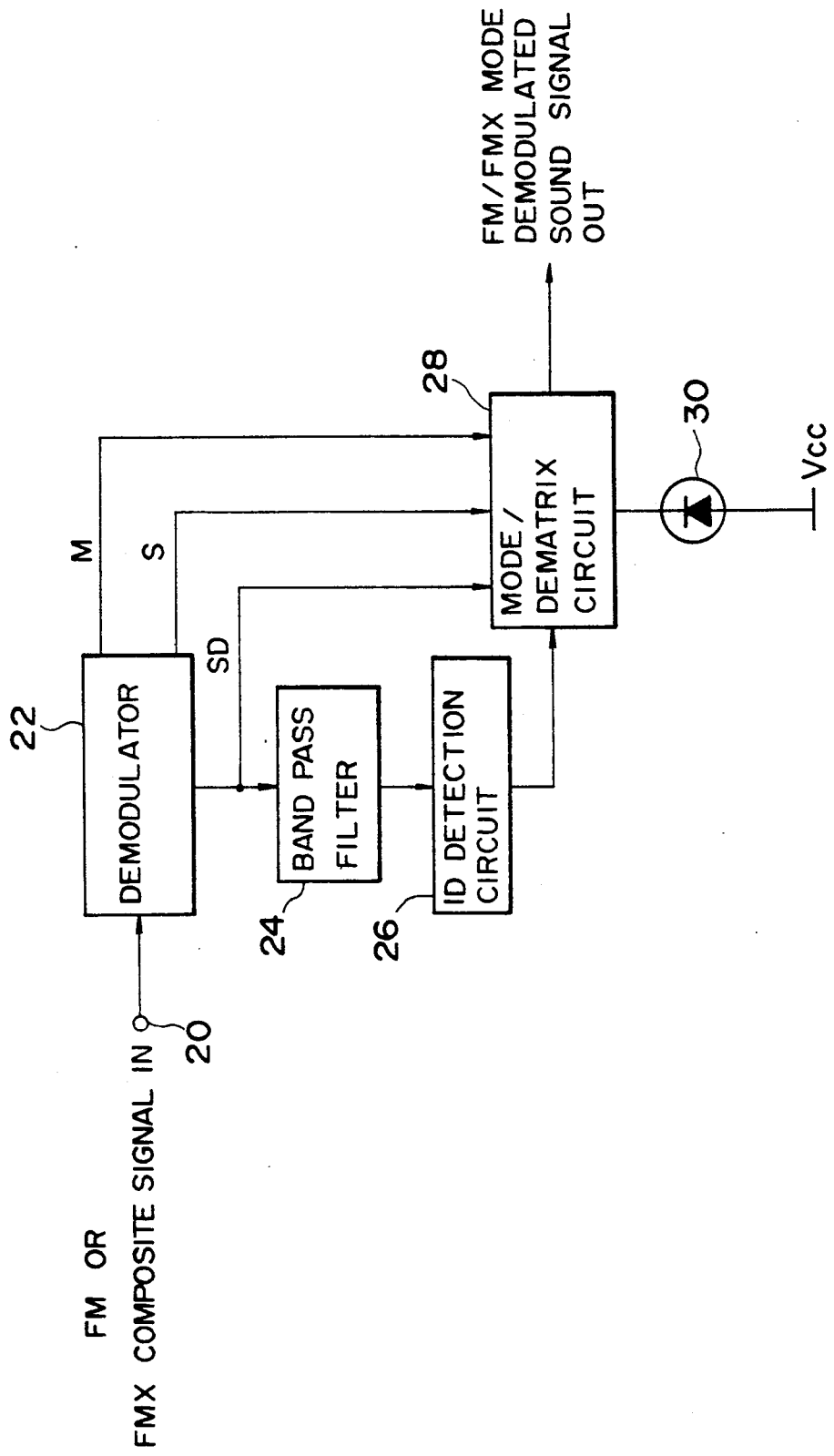
FIG. 1 shows a block diagram of a conventional FMX ID signal detection apparatus.
Figure 2:
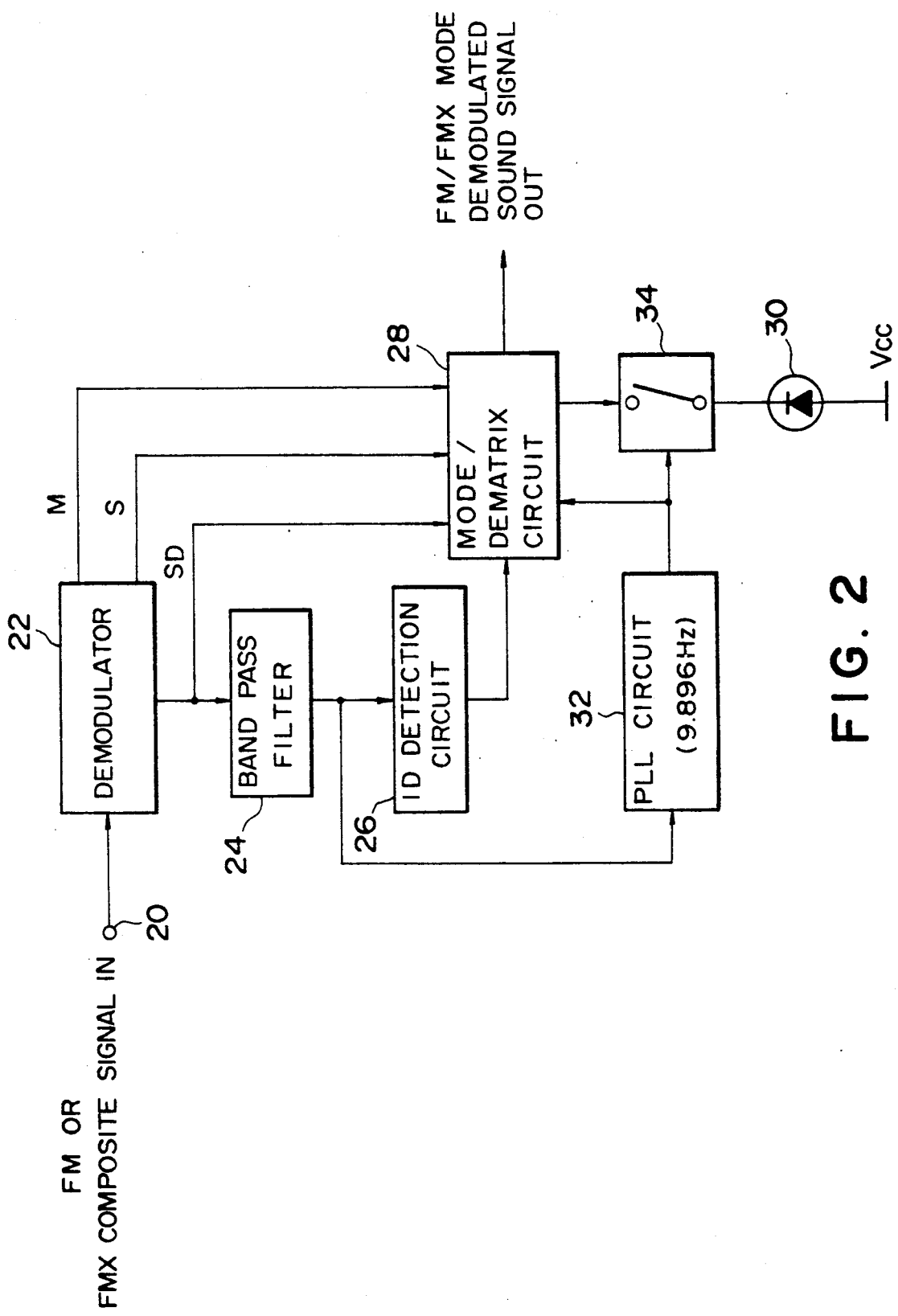
FIG. 2 shows a block diagram of a preferred embodiment of a FMX ID signal detection apparatus according to the present invention.
Figure 3:
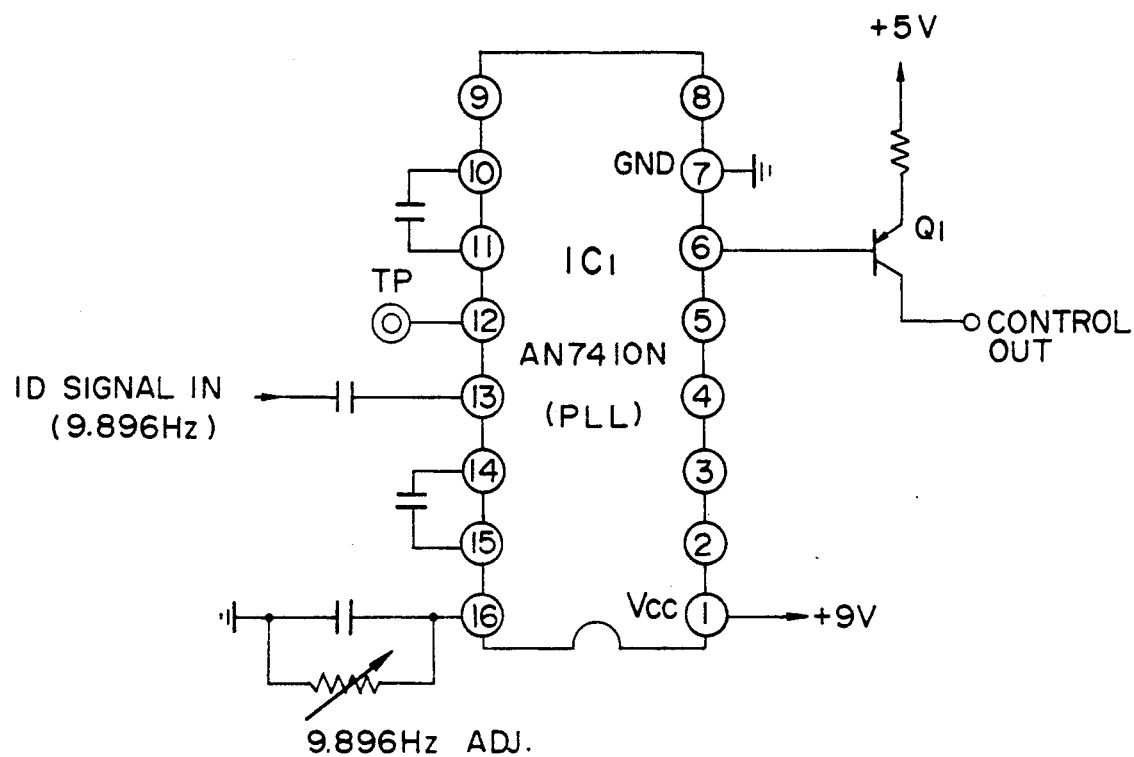
FIG. 3 shows a configuration of a phase-locked loop circuit.

Throughout FIGS. 1, 2 and 3, like reference numerals and letters are used to designate like or equivalent elements for the sake of simplicity of explanation.

FIG. 2 shows a preferred embodiment of a FMX ID signal detection apparatus according to the present invention.

A FM signal or FMX composite signal is applied to a terminal 20 by a receiving means not shown. The terminal 20 is connected to a demodulator 22 at its input. The demodulator 22 demodulates the applied signal to produce a sum signal M and a difference signal S if the applied signal is the FM signal, while produces a FMX difference signal SD other than those signals if the FMX composite signal.

The demodulator 22 at its output where the signal SD is produced is connected to a band pass filter 24 at its input. And the band pass filter 24 at its output is connected to an ID detection circuit 26 and also a PLL (Phase—Locked Loop) circuit 32 at their inputs, respectively, the demodulator 22, bandpass filter 24 and ID detection circuit 26 function same as those shown in FIG. 1. The PLL circuit 32 is so arranged that it locks onto a frequency of 9.896 Hz of an ID signal.

FIG. 3 shows an example of the PLL circuit 32, which comprises a PLL $IC_1$ AN 7410N manufactured by MATUSHITA CO. Japan and PNP transistor $Q_1$ for producing a lock detection signal as a control signal.

When a signal with a frequency of 9.986 Hz is applied to a terminal 13 of the $IC_1$, the $IC_1$ locks onto that frequency. This leads to voltage-drop from 5 to 0 V at terminal 6 of the $IC_1$.

As a result, the PNP transistor $Q_1$ whose base is connected to the terminal 6 turns on to produce the control signal at its collector for controlling other circuits.

The ID detection citcuit 216 at its output is connected to a mode/dematrix circuit 28a at its input. On the other hand, the demodulator 22 at its all outputs are connected to the mode/dematrix circuit 28a at its other input, respectively. The PLL circuit 32 at its control output side is further connected to the mode/dematrix circuit 28a at its still other input. The mode/dematrix circuit 28a produces demodulated sound signal and its FMX mode/dematrix output is connected to a FMX indicator 30 through a switch 34. The PLL circuit 32 at its control output side is also connected to the switch 34 at its control signal input.

When the FM signal is received, it is demodulated by the demodulator 22. The signals M and S are produced therefrom and applied to the mode/dematrix circuit 28a. The mode/dematrix circuit 28 produces stereo signals L and R by matrix processing based on the applied signals M and S.

The signal SD is not usually produced, but the ID detection circuit 26 sometimes erroneously acknowledges the ID signal due to noise. However, the PLL circuit 32 does not lock with respect to the acknowledgement. Thus, the switch 34, is still off so that the FMX indicator 30 is not operated and also erroneous sound signal at FMX mode is not produced.

On the other hand, when the FMX composite signal is received, the demodulator 22 produces the signal SD other than the signals M and S. Therefore, the ID detection circuit 26 acknowledges the ID signal and then the PLL circuit 32 locks onto the frequency of the ID signal and produces a control signal, to permit dematrix processing of the mode/dematrix circuit 28a. The mode/dematrix circuit 28a performs dematrix processing at FMX mode to produce the stereo signals L and R with low noise and produces a FMX mode/dematrix signal.

The switch 34 is turned on by the control signal. Thus, the FMX indicator 30 is operated by the FMX mode-dematrix signal to indicate the FMX mode.

The present invention may be embodied in other specific forms without departing from the spirit or essential characteristics thereof. For example, the switch 34 may be provided in the input side of the mode/dematrix circuit 28a.

As is understood from the foregoing, according to the present invention, there is provided the PLL circuit which locks onto the frequency of the ID signal included in the FMX composite signal so that malfunction due to noises is prevented and the ID signal is preferably detected.

What is claimed is:

1. An FME identification signal detection apparatus for discriminating between an FM broadcasting by means of an FM signal including sum and difference signals obtained from stereophonically related audio frequency source signals by matrix processing and an FMX broadcasting by means of an FMX composite signal including a compressed difference signal which has a frequency component corresponding to an FMX identification signal, obtained by compressing the dynamic range of the difference signal, an FMX identification signal and the sum and difference signals, comprising:

reproducing means for reproducing the sum and difference signals when the FM signal is applied thereto and form reproducing the sum and difference signals and the compressed difference signal when the FMX composite signal is applied thereto;

filter means for picking a frequency component from the comporssed difference signal;

identification signal detection means for detecting the FMX identification signal based on the level of the frequency component thus picked to produce an FMX detection signal;

phase-locked loop circuit means for producing a control signal in the case where the frequency component is identical to the frequency of the FMX identification signal so that the circuit means locks onto the frequency component;

mode/dematrix circuit means for performing dematrix processing at FM mode when the sum and difference signals are applied thereto to produce the source signals and also performing dematrix processing at FMX mode when the sum and difference signals, the compressed difference signal, the FMX detection signal and the control signal are applied thereto to produce the source signals:

switching gate means connected to the phase-locked loop circuit and to the mode/circuit and being responsive to the control signal for passing an FMX mode-dematrix indicator signal therethrough; and indicating means connected to the switching gate means for indicating that the FMX broadcasting is being received in response to said FMX mode-dematrix indicator signal passing through the switching gate means.

2. A FMX identification signal detection apparatus according to claim 1, wherein the mode/dematrix circuit means produces a FMX mode-dematrix signal in the case of performing the dematrix processing at FMX mode.

* * * * *